(12) United States Patent
Katou

(10) Patent No.: US 6,531,912 B2
(45) Date of Patent: Mar. 11, 2003

(54) HIGH VOLTAGE GENERATING CIRCUIT IMPROVED IN PARASITIC CAPACITANCE OF VOLTAGE-DIVIDING RESISTANCE

(75) Inventor: Kazuaki Katou, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/790,491

(22) Filed: Feb. 23, 2001

(65) Prior Publication Data

US 2001/0030364 A1 Oct. 18, 2001

(30) Foreign Application Priority Data

Feb. 25, 2000 (JP) .................................... 2000-049126

(51) Int. Cl.⁷ ............................................... G05F 3/02
(52) U.S. Cl. ........................................ 327/536; 327/534
(58) Field of Search ................................. 327/534, 535, 327/537, 545, 546

(56) References Cited

U.S. PATENT DOCUMENTS

| | | | | |
|---|---|---|---|---|
| 5,300,805 A | * | 4/1994 | Demicheli et al. ........... | 257/503 |
| 5,329,168 A | * | 7/1994 | Sugibayashi et al. ....... | 327/433 |
| 5,754,417 A | * | 5/1998 | Nicollini ..................... | 327/536 |
| 5,994,888 A | * | 11/1999 | Yanagawa .................. | 323/313 |
| 6,259,312 B1 | * | 7/2001 | Murtojarvi ................. | 327/308 |
| 6,353,357 B1 | * | 3/2002 | Kaiser et al. ................ | 326/34 |

FOREIGN PATENT DOCUMENTS

| JP | A 58-66351 | 4/1983 |
|---|---|---|
| JP | A 59-218766 | 12/1984 |
| JP | A 8-306870 | 11/1996 |
| JP | A 11-186503 | 7/1999 |

* cited by examiner

*Primary Examiner*—Terry D. Cunningham
(74) *Attorney, Agent, or Firm*—Young & Thompson

(57) ABSTRACT

The present invention provides a circuitry comprising: a first circuit for rising a voltage level, the first circuit having an output terminal connected to a high voltage output line for outputting a high voltage output; a comparator having an output terminal connected to an input side of the first circuit, the comparator further having a first input terminal and a second input terminal for receiving a reference voltage; and a voltage dividing circuit connected between the high voltage output line and a low voltage line having a substantially fixed lower potential than the high voltage output line, the voltage dividing circuit having an output node which is connected to the first input terminal of the comparator for outputting a divided voltage output and the voltage dividing circuit having at least a resistance between the output node and the high voltage output line, wherein a parasitic capacitance of the at least resistance between the output node and the high voltage output line is connected to the high voltage output line.

30 Claims, 13 Drawing Sheets

US 6,531,912 B2

HIGH VOLTAGE GENERATING CIRCUIT IMPROVED IN PARASITIC CAPACITANCE OF VOLTAGE-DIVIDING RESISTANCE

BACKGROUND OF THE INVENTION

The present invention relates to a semiconductor integrated circuit, and more particularly to a semiconductor integrated circuit improved in parasitic capacitance of a voltage-dividing resistance in a high voltage generating circuit for a memory device.

It has been required for development of a non-volatile semiconductor memory to realize a highly accurate control to a high output voltage level for a device withstand voltage, and write and erasing operations. FIG. 1 is a circuit diagram illustrative of a first conventional high voltage generating circuit for generating a highly accurate high voltage for writing and erasing operations of the non-volatile semiconductor memory. The first conventional high voltage generating circuit comprises a booster circuit 1, a comparator 2, and first and second voltage dividing resistances R1 and R2. The booster circuit 1 has a first input terminal for receiving a clock signal CLK and a second input terminal connected to an output terminal of the comparator 2 for receiving a control signal Vc from the comparator 2. The booster circuit 1 generates a high voltage output Vo which is outputted from its output terminal. A voltage dividing circuit is provided which comprises a series connection of the first and second voltage-dividing resistances R1 and R2 between the output terminal of the booster circuit 1 and a ground level. The first voltage-dividing resistance R1 is connected in series between the output terminal of the booster circuit 1 and the second voltage-dividing resistance R2. The second voltage-dividing resistance R2 is connected in series between the ground terminal and the first voltage-dividing resistance R1. The comparator 2 has a first input terminal connected to an output terminal of the voltage-dividing circuit or an intermediate point between the first and second voltage dividing resistances R1 and R2 for receiving a voltage Vi divided by the voltage-dividing circuit. The comparator 2 also has a second input terminal for receiving a reference voltage Vr for allowing the voltage Vi to be compared with the reference voltage Vr, whereby the comparator 2 generates the control signal Vc and output the same from its output terminal. The first voltage dividing resistance R1 has a first parasitic capacitance C2. The second voltage dividing resistance R2 has a second parasitic capacitance C3. Since the booster circuit 1 has a low capability of supplying the current, it is required to reduce the currents flowing through the series connections of the first and second voltage-dividing resistances R1 and R2, The resistance values of the first and second voltage-dividing resistances R1 and R2 are required to be high, provided that the high relative accuracy in resistance value of each of the first and second voltage-dividing resistances R1 and R2 is also necessary. For those purposes, the first and second voltage-dividing resistances R1 and R2 may further comprise polysilicon resistances which are low in bias-dependency and are suitable to be higher resistances than the diffusion resistances.

The first and second voltage-dividing resistances R1 and R2 need larger occupying areas than other resistances, whereby the larger occupying areas of the first and second voltage-dividing resistances R1 and R2 result in the increases in parasitic capacitances C2 and C3. The first voltage-dividing resistance R1 has a first time constant which is defined by the resistance value and the parasitic capacitance value thereof. The second voltage-dividing resistance R2 has a second time constant which is defined by the resistance value and the parasitic capacitance value thereof. The accuracy in the voltage level of the high voltage output depends on the time constant. As the time constants of the first and second voltage-dividing resistances R1 and R2 are increased, then the accuracy in the voltage level of the high voltage output is deteriorated. FIG. 2 is a diagram illustrative of the waveform of the high voltage output of the first conventional high voltage generating circuit of FIG. 1. FIG. 2 shows a ripple width "v" represented by a vertical arrow mark, an expected level represented by a horizontal broken line, delay times of the comparator represented by two horizontal short arrow marks and a delay of the voltage-dividing resistance represented by a horizontal long arrow mark. The first time constant defined by the first voltage-dividing resistance R1 and the first parasitic capacitance C2 and the second time constant defined by the second voltage-dividing resistance R2 and the second parasitic capacitance C3 cause a delay in time of the divided voltage Vi appearing on the output terminal between the first and second voltage-dividing resistances R1 and R2 of the voltage-dividing circuit. The delay in time of the divided voltage Vi increases a delay time of a feed-back path from the output terminal of the booster circuit 1 to the output terminal of the comparator 2. During this delay time period, it is difficult to control the booster circuit, whereby the high voltage output has a large ripple width and a deteriorated accuracy in its voltage level.

The ripple width is given by the following equation.

$$V=\{Dt1\times(R1\times C2)+Dt2\}\times Vdt \qquad (1)$$

where "Dt1" is the delay of the voltage-dividing resistances, and "Dt2" is the delay of the comparator, and "Vdt" is a voltage rising rate per a unit time or a boosting capability. FIG. 3 is a diagram illustrative of a result of the simulation to the first conventional circuit of FIG. 1. The ripple width of the high voltage output is 700 mV. The large ripple width means the low accuracy in voltage level of the high voltage output. It is necessary for improving the accuracy in voltage level of the high voltage output to reduce the ripple width of the high voltage output- A second conventional high voltage generating circuit has been proposed for reducing the ripple width.

FIG. 4 is a circuit diagram illustrative of a second conventional high voltage generating circuit for generating a highly accurate high voltage for writing and erasing operations of the non-volatile semiconductor memory. The second conventional high voltage generating circuit further has a speed up capacitor C1. Namely, the second conventional high voltage generating circuit comprises a booster circuit 1, a comparator 2, and first and second voltage dividing resistances R1 and R2 as well as a capacitor C1 so called to as speed up capacitor. The booster circuit 1 has a first input terminal for receiving a clock signal CLK and a second input terminal connected to an output terminal of the comparator 2 for receiving a control signal Vc from the comparator 2. The booster circuit 1 generates a high voltage output Vo which is outputted from its output terminal. A voltage dividing circuit is provided which comprises a series connection of the first and second voltage-dividing resistances R1 and R2 between the output terminal of the booster circuit I and a ground level. The first voltage-dividing resistance R1 is connected in series between the output terminal of the booster circuit 1 and the second voltage-dividing resistance R2. The second voltage-dividing resistance R2 is connected in series between the ground terminal and the first voltage-dividing resistance R1. The comparator 2 has a first input terminal connected to an output terminal of the voltage-dividing circuit or an intermediate point between the first and second voltage dividing resistances R1 and R2 for receiving a voltage Vi divided by the voltage-dividing circuit, The comparator 2 also has a second input terminal for receiving a reference voltage Vr for allowing the voltage Vi to be compared with the reference voltage Vr, whereby the comparator 2 generates the control signal Vc and output the same from its output terminal. The first voltage dividing resistance R1 has a first parasitic capacitance C2. The second voltage dividing resistance R2 has a second parasitic capacitance C3. The capacitor C1 as the speed up capacitor is connected between the output terminal of the booster circuit 1 and the first input terminal of the comparator 2. Namely, the capacitor C1 as the speed tip capacitor is connected between the output terminal of the booster circuit 1 and the output terminal of the voltage-dividing circuit. The further provision of the speed up capacitor C1 for reducing the ripple width causes the increase in the occupied area of the second conventional high voltage generating circuit. FIG. 5 is a diagram illustrative of a result of the simulation to the second conventional circuit of FIG. 4. The ripple width of the high voltage output is reduced to 300 mV, provided that the speed up capacitance C1 is 0.3 pF. The further provision of the speed up capacitor of the second conventional high voltage generating circuit reduces the ripple width or improves the accuracy in voltage level of the high voltage output, however, with the increase in the occupied area of the high voltage generating circuit.

In the above circumstances, it had been required to develop a novel high voltage generating circuit free from the above problem.

SUMMARY OF THE INVENTION

Accordingly, it is an object of the present invention to provide a novel high voltage generating circuit free from the above problems.

It is a further object of the present invention to provide a novel high voltage generating circuit with a suppressed increase in occupied area of the circuit even a speed up capacitor is further provided.

It is a still further object of the present invention to provide a novel high voltage generating circuit reduced in ripple width.

It is yet a further object of the present invention to provide a novel high voltage generating circuit improved in accuracy in voltage level of a high voltage output.

The present invention provides a circuitry comprising; a first circuit for rising a voltage level, the first circuit having an output terminal connected to a high voltage output line for outputting a high voltage output; a comparator having an output terminal connected to an input side of the first circuit, the comparator further having a first input terminal and a second input terminal for receiving a reference voltage; and a voltage dividing circuit connected between the high voltage output line and a low voltage line having a substantially fixed lower potential than the high voltage output line, the voltage dividing circuit having an output node which is connected to the first input terminal of the comparator for outputting a divided voltage output; and the voltage dividing circuit having at least a resistance between the output node and the high voltage output line, wherein a parasitic capacitance of the at least resistance between the output node and the high voltage output line is connected to the high voltage output line.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
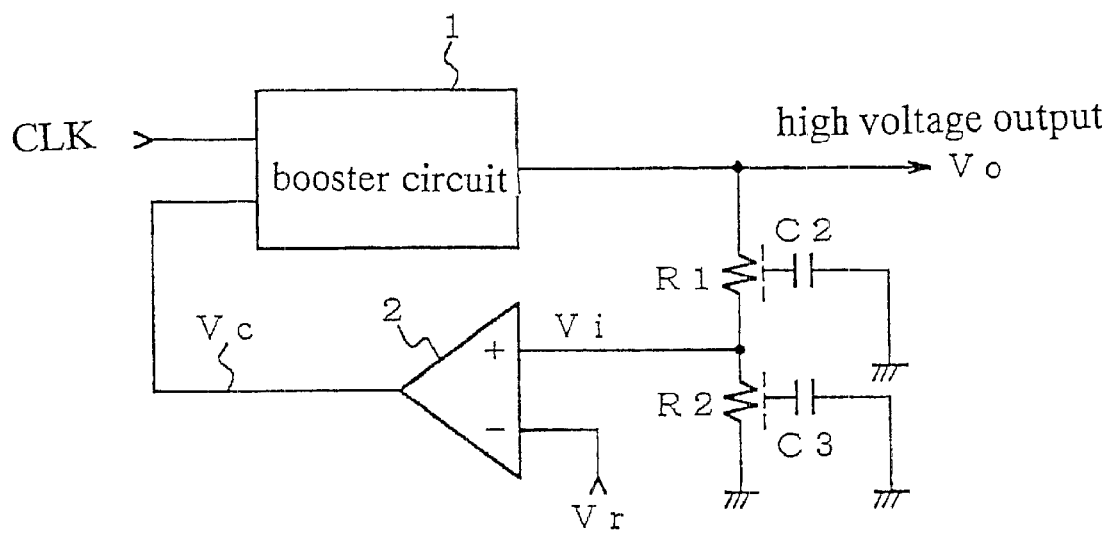
FIG. 1 is a circuit diagram illustrative of a first conventional high voltage generating circuit for generating a highly accurate high voltage for writing and erasing operations of the non-volatile semiconductor memory.
Figure 2:
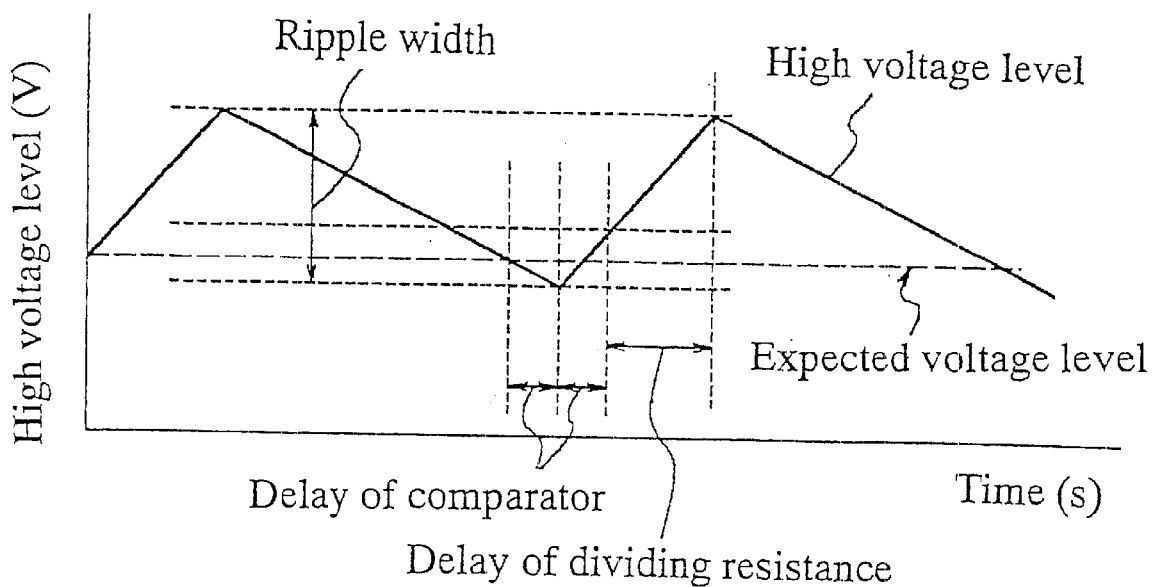
FIG. 2 shows a ripple width "v" represented by a vertical arrow mark, an expected level represented a horizontal broken line, delay times of the comparator represented by two horizontal short arrow marks and a delay of the voltage-dividing resistance represented by a horizontal long arrow mark.
Figure 3:
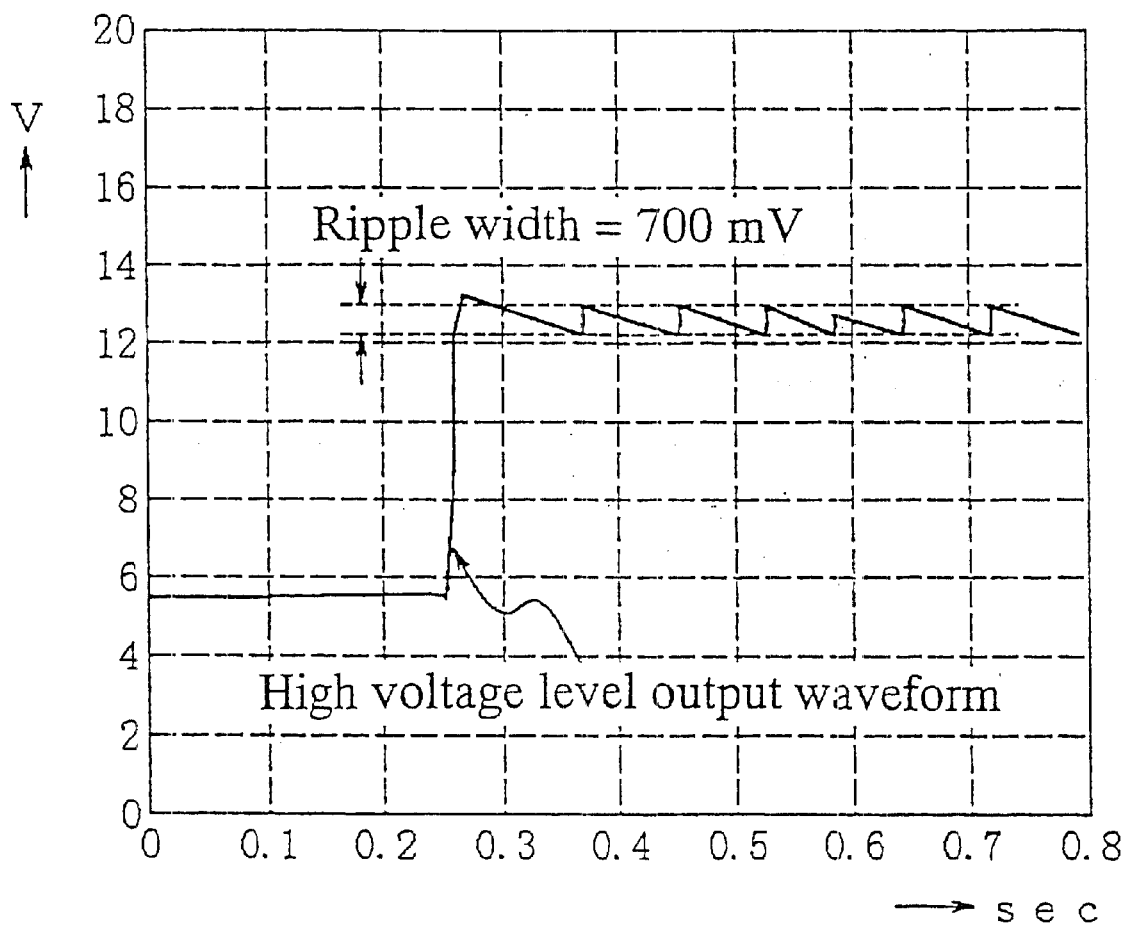
FIG. 3 is a diagram illustrative of a result of the simulation to the first conventional circuit of FIG. 1.
Figure 4:
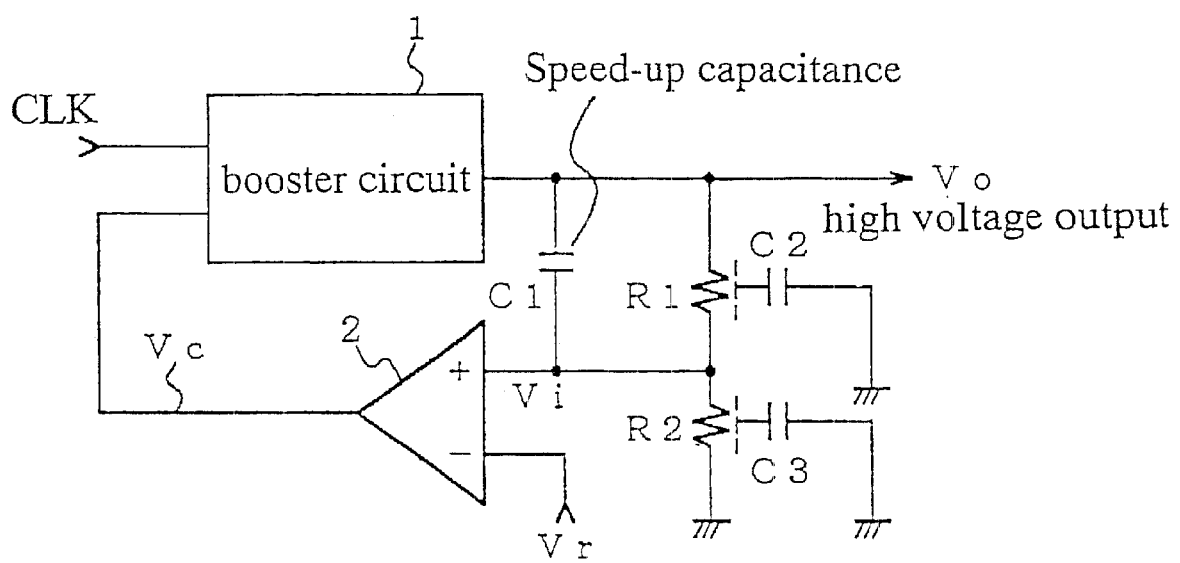
FIG. 4 is a circuit diagram illustrative of a second conventional high voltage generating circuit for generating a highly accurate high voltage for writing and erasing operations of the non-volatile semiconductor memory.
Figure 5:
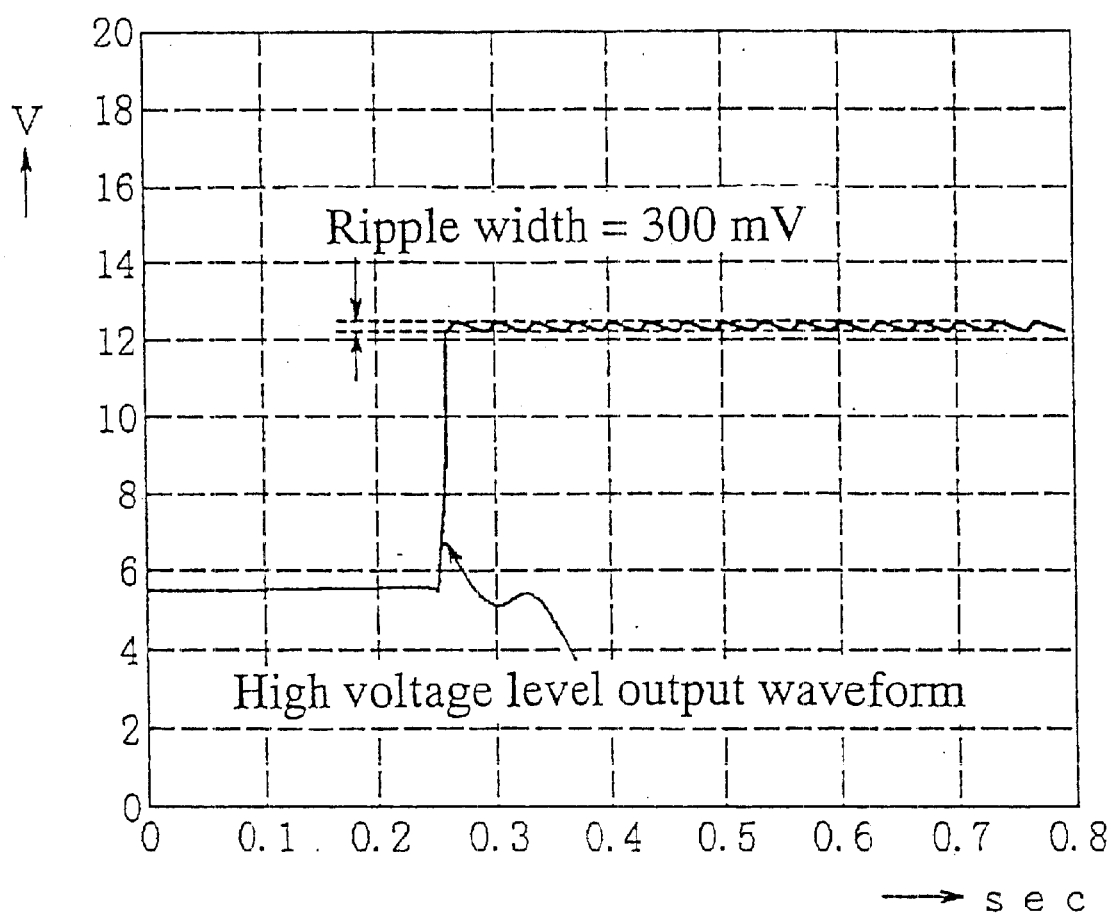
FIG. 5 is a diagram illustrative of a result of the simulation to the second conventional circuit of FIG. 4.

The first present invention provides a circuitry comprising a first circuit for rising a voltage level, the first circuit having an output terminal connected to a high voltage output line for outputting a high voltage output; a comparator having an output terminal connected to an input side of the first circuit, the comparator further having a first input terminal and a second input terminal for receiving a reference voltage; and a voltage dividing circuit connected between the high voltage output line and a low voltage line having a substantially fixed lower potential than the high voltage output line, the voltage dividing circuit having an output node which is connected to the first input terminal of the comparator for outputting a divided voltage output; and the voltage dividing circuit having at least a resistance between the output node and the high voltage output line, wherein a parasitic capacitance of the at least resistance between the output node and the high voltage output line is connected to the high voltage output line.

It is preferable that the at least resistance between the output node and the high voltage output line comprises a plurality of resistances connected in series, and a parasitic capacitance of at least closest one of the resistances to the output node is connected to the high voltage output line.

It is further preferable that parasitic capacitances of all of the resistances are connected to the high voltage output line.

It is further more preferable that the resistances have further parasitic capacitances connected to each other.

It is also preferable that the at least resistance between the output node and the high voltage output line comprises two resistances connected in series, and parasitic capacitances of the two resistances are connected to the high voltage output line.

It is also preferable that the at least resistance between the output node and the high voltage output line comprises two resistances connected in series, and a parasitic capacitance of first one of the two resistances closer to the output node is connected to the high voltage output line and a parasitic capacitance of second one of the two resistances closer to the high voltage line is connected to the low voltage line.

It is also preferable that the first circuit comprises a booster circuit.

It is also preferable that the low voltage line comprises a ground line.

It is also preferable that resistances of the voltage dividing circuit comprises electrically conductive layers provided in an insulating layer extending over a semiconductor substrate, and the electrically conductive layer of the at least resistance between the output node and the high voltage output line is positioned over a well region in the semiconductor substrate and is isolated by the insulating layer, so that a parasitic capacitance of the at least resistance is formed between the well region and the electrically conductive layer, and the well region is electrically connected to the high voltage output line.

It is further preferable that the well region has a first conductivity type and the semiconductor substrate has a second conductivity type and the semiconductor substrate is electrically connected to the low voltage line.

It is further more preferable that the low voltage line comprises a ground line.

It is also preferable that the high voltage output line, the output node and the low voltage are provided over a top surface of the insulating layer, It is also preferable that the electrically conductive layers comprise polysilicon layers.

It is also preferable that the at least resistance between the output node and the high voltage output line comprises first and second resistances, and the first resistance comprises a first electrically conductive layer extending over a first insulating layer which extending over a well region in a semiconductor substrate, and the well region is electrically connected to the high voltage output line, and a parasitic capacitance of the first resistance is provided across the first insulating layer between the well region and the first electrically conductive layer; and the second resistance comprises a second electrically conductive layer extending over a second insulating layer which extending over the first electrically conductive layer, and the second electrically conductive layer is electrically connected to the high voltage output line.

It is moreover preferable that the well region has a first conductivity type and the semiconductor substrate has a second conductivity type and the semiconductor substrate is electrically connected to the low voltage line.

It is still more preferable that the low voltage line comprises a ground line.

It is also preferable that the first and second electrically conductive layers comprise polysilicon layers.

It is also preferable that the voltage dividing circuit has at least a low voltage side resistance between the output node and the low voltage line, and a parasitic capacitance of the at least low voltage side resistance is connected to the low voltage line.

The second present invention provides a high voltage generating circuit in a semiconductor device comprising: a booster circuit having a first input terminal for receiving a clock signal and a second input terminal, and also the booster circuit having an output terminal connected to a high voltage output line for outputting a high voltage output; a comparator having an output terminal connected to the second input terminal of the booster circuit, the comparator further having a first input terminal and a second input terminal for receiving a reference voltage; and a voltage dividing circuit connected between the high voltage output line and a low voltage line having a substantially fixed lower potential than the high voltage output line, the voltage dividing circuit having an output node which is connected to the first input terminal of the comparator for outputting a divided voltage output; and the voltage dividing circuit having at least a resistance between the output node and the high voltage output line, and the voltage dividing circuit having at least a low voltage side resistance between the output node and the low voltage line, wherein a parasitic capacitance of the at least resistance between the output node and the high voltage output line is connected to the high voltage output line, and a parasitic capacitance of the at least low voltage side resistance is connected to the low voltage line.

It is preferable that the at least resistance between the output node and the high voltage output line comprises a plurality of resistances connected in series, and a parasitic capacitance of at least closest one of the resistances to the output node is connected to the high voltage output line.

It is further preferable that parasitic capacitances of all of the resistances are connected to the high voltage output line.

It is further more preferable that the resistances have further parasitic capacitances connected to each other.

It is moreover preferable that the at least resistance between the output node and the high voltage output line comprises two resistances connected in series, and parasitic capacitances of the two resistances are connected to the high voltage output line.

It is also preferable that the at least resistance between the output node and the high voltage output line comprises two resistances connected in series, and a parasitic capacitance of first one of the two resistances closer to the output node is connected to the high voltage output line and a parasitic capacitance of second one of the two resistances closer to the high voltage line is connected to the low voltage line.

It is also preferable that the low voltage line comprises a ground line.

It is also preferable that resistances of the voltage dividing circuit comprises electrically conductive layers provided in an insulating layer extending over a semiconductor substrate, and the electrically conductive layer of the at least resistance between the output node and the high voltage output line is positioned over a well region in the semiconductor substrate and is isolated by the insulating layer, so that a parasitic capacitance of the at least resistance is formed between the well region and the electrically conductive layer, and the well region is electrically connected to the high voltage output line.

It is still further preferable that the well region has a first conductivity type and the semiconductor substrate has a second conductivity type and the semiconductor substrate is electrically connected to the low voltage line.

It is further more preferable that the low voltage line comprises a ground line.

It is also preferable that the high voltage output line, the output node and the low voltage are provided over a top surface of the insulating layer.

It is also preferable that the electrically conductive layers comprise polysilicon layers.

It is also preferable that the at least resistance between the output node and the high voltage output line comprises first and second resistances, and the first resistance comprises a first electrically conductive layer extending over a first insulating layer which extending over a well region in a semiconductor substrate, and the well region is electrically connected to the high voltage output line, and a parasitic capacitance of the first resistance is provided across the first insulating layer between the well region and the first electrically conductive layer ; and the second resistance comprises a second electrically conductive layer extending over a second insulating layer which extending over the first electrically conductive layer, and the second electrically conductive layer is electrically connected to the high voltage output line.

It is further preferable that the well region has a first conductivity type and the semiconductor substrate has a second conductivity type and the semiconductor substrate is electrically connected to the low voltage line.

It is still further preferable that the low voltage line comprises a ground line.

It is also preferable that the first and second electrically conductive layers comprise polysilicon layers.

PREFERRED EMBODIMENT

FIRST EMBODIMENT

Figure 6:
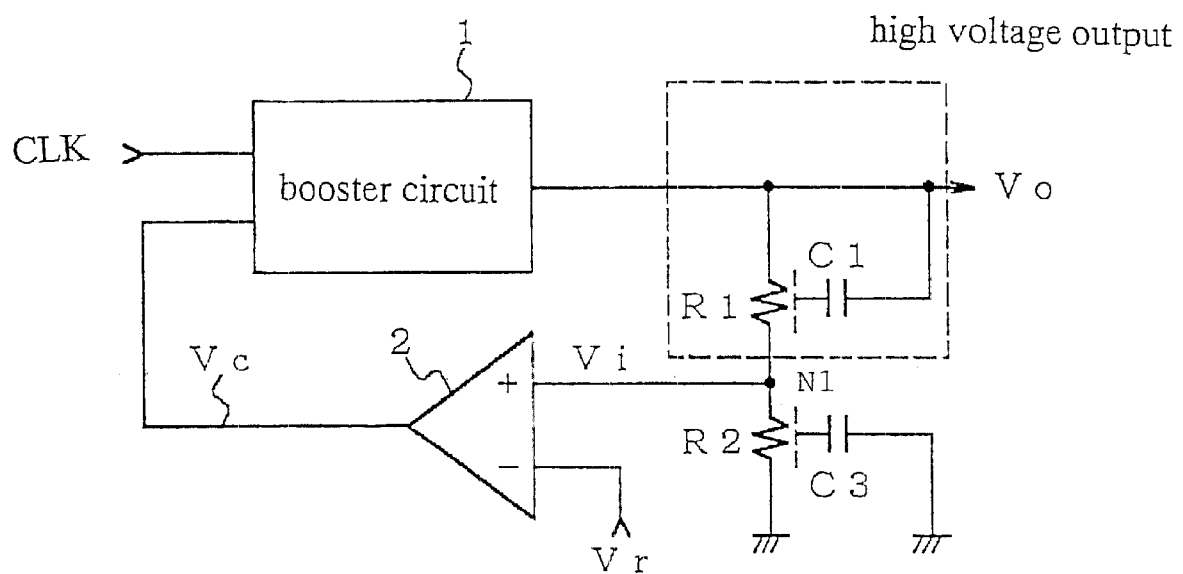
FIG. 6 is a circuit diagram illustrative of a first novel high voltage generating circuit for generating a highly accurate high voltage for writing and erasing operations of the non-volatile semiconductor memory in a first embodiment according to the present invention.

A first embodiment according to the present invention will be described in detail with reference to the drawings. FIG. 6 is a circuit diagram illustrative of a first novel high voltage generating circuit for generating a highly accurate high voltage for writing and erasing operations of the non-volatile semiconductor memory in a first embodiment according to the present invention. The first novel high voltage generating circuit comprises a booster circuit 1, a comparator 2, and a voltage dividing circuit which further comprises a series connection of first and second voltage dividing resistances R1 and R2. The booster circuit 1 has a first input terminal for receiving a clock signal CLK and a second input terminal connected to an output terminal of the comparator 2 for receiving a control signal Vc from the comparator 2. The booster circuit 1 generates a high voltage output Vo which is outputted from its output terminal. The voltage dividing circuit, which comprises the series connection of the first and second voltage-dividing resistances R1 and R2, is provided between the high voltage output line connected to the output terminal of the booster circuit 1 and a ground line. The first voltage-dividing resistance R1 is connected in series between the output terminal of the booster circuit 1 and the second voltage-dividing resistance R2. The second voltage-dividing resistance R2 is connected in series between the ground terminal and the first voltage-dividing resistance R1. An output node N1 is provided at an intermediate point between the first and second voltage-dividing resistances R1 and R2. Namely, the first voltage-dividing resistance R1 is connected in series between the high voltage output line and the output node N1 of the voltage dividing circuit. The second voltage-dividing resistance R2 is connected in series between the ground line and the output node N1 of the voltage dividing circuit. The comparator 2 has a first input terminal connected to the output node N1 of the voltage-dividing circuit or the intermediate point between the first and second voltage dividing resistances R1 and R2 for receiving a voltage Vi divided by the voltage-dividing circuit. The comparator 2 also has a second input terminal for receiving a reference voltage Vr for allowing the voltage Vi to be compared with the reference voltage Vr, whereby the comparator 2 generates the control signal Vc and output the same from its output terminal. The first voltage dividing resistance R1 connected in series between the high voltage output line and the output node N1 of the voltage dividing circuit has a first parasitic capacitance C1. The second voltage dividing resistance R2 connected in series between the ground line and the output node N1 of the voltage dividing circuit has a second parasitic capacitance C2. The resistance values of the first and second voltage-dividing resistances R1 and R2 are required to be high, provided that the high relative accuracy in resistance value of each of the first and second voltage-dividing resistances R1 and R2 is also necessary. For those purposes, the first and second voltage-dividing resistances R1 and R2 may further comprise polysilicon resistances which are low in bias-dependency and are suitable to be higher resistances than the diffusion resistances.

The first and second voltage-dividing resistances R1 and R2 need larger occupying areas than other resistances, whereby the larger occupying areas of the first and second voltage-dividing resistances R1 and R2 result in the increases in first and second parasitic capacitances C1 and C2. The first voltage-dividing resistance R1 has a first time constant which is defined by the resistance value and the parasitic capacitance value thereof. The second voltage-dividing resistance R2 has a second time constant which is defined by the resistance value and the parasitic capacitance value thereof. The accuracy in the voltage level of the high voltage output depends on the time constant. The first parasitic capacitance C1 is connected to an output terminal of the first novel high voltage generating circuit, wherein the output terminal of the first novel high voltage generating circuit is connected to the output terminal of the booster circuit 1, so that the first parasitic capacitance C1 serves as a speed up capacitor. The second parasitic capacitance C2 is connected to the ground line.

It is important for the present invention that the first parasitic capacitance C1 of the first voltage dividing resistance R1 is connected to an output terminal of the first novel high voltage generating circuit, so that the first parasitic capacitance C1 serves as a speed up capacitor. It is unnecessary to further provide any further speed up capacitor. Accordingly, the first parasitic capacitor serving as the speed up capacitor of the first voltage dividing resistance R1 reduces the ripple width or improves the accuracy in voltage level of the high voltage output without, however, any further increase in the occupied area of the high voltage generating circuit.

Figure 7A:
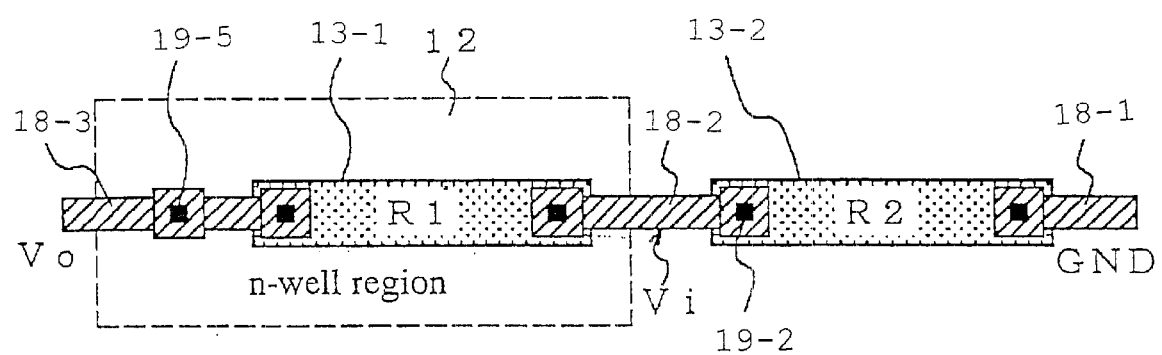
FIG. 7A is a fragmentary plan view illustrative of the voltage-dividing circuit of the first novel high voltage generating circuit in FIG. 6 realized in the semiconductor integrated circuit in the first embodiment in accordance with the present invention.
Figure 7B:
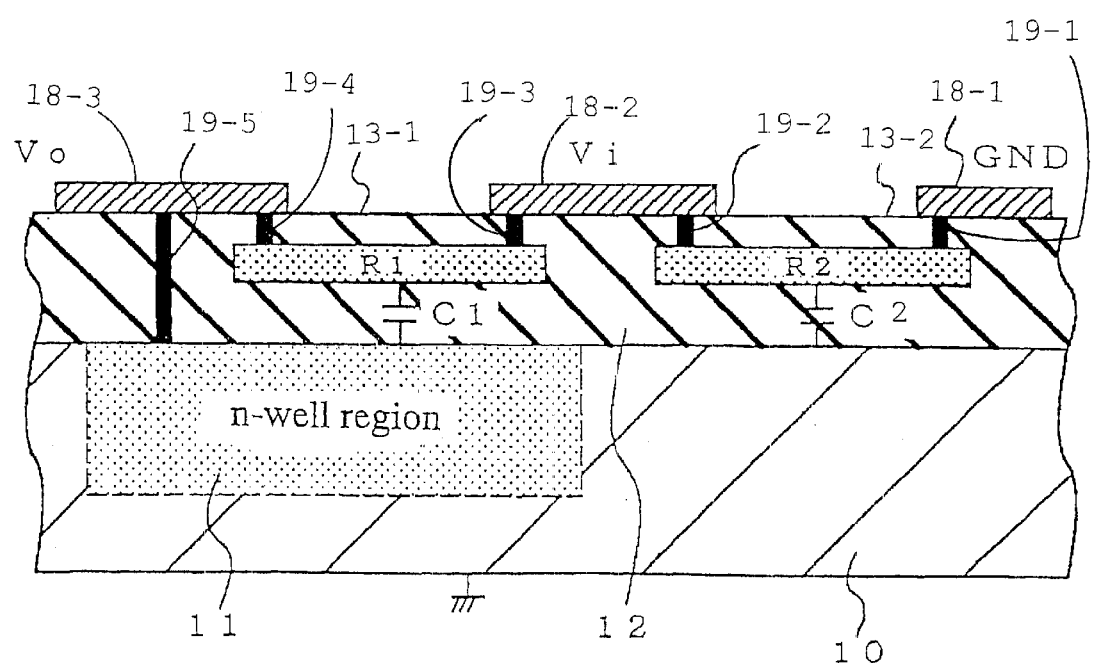
FIG. 7B is a fragmentary cross sectional elevation view illustrative of the voltage-dividing circuit of the first novel high voltage generating circuit in FIG. 6 realized in the semiconductor integrated circuit in the first embodiment in accordance with the present invention.

The above first novel high voltage generating circuit is incorporated in the semiconductor integrated circuit. FIG. 7A is a fragmentary plan view illustrative of the voltage-dividing circuit of the first novel high voltage generating circuit in FIG. 6 realized in the semiconductor integrated circuit in the first embodiment in accordance with the present invention. FIG. 7B is a fragmentary cross sectional elevation view illustrative of the voltage-dividing circuit of the first novel high voltage generating circuit in FIG. 6 realized in the semiconductor integrated circuit in the first embodiment in accordance with the present invention.

A p-type semiconductor substrate 10 has an n-well region 11 in its selective upper region. An insulating film 12 extends over the p-type semiconductor substrate 10 and the n-well region 11. A first polysilicon layer 13-1 is selectively formed in the insulating layer 12 at a predetermined depth, so that the first polysilicon layer 13-1 is positioned over the n-well region 11 and isolated from the n-well region 11 by the insulating layer 12, and also that the first polysilicon layer 13-1 is completely buried in the insulating layer 12 so that the top surface of the first polysilicon layer 13-1 is covered by the insulating layer 12. The first parasitic capacitor C1 is formed between the first polysilicon layer 13-1 and the n-well region 11. A second polysilicon layer 13-2 is selectively formed in the insulating layer 12 at a predetermined depth, so that the second polysilicon layer 13-2 is positioned at the same depth or the same level as the first polysilicon layer 13-1 and isolated from the first polysilicon layer 13-1 by the insulating layer 12. The second polysilicon layer 13-2 is also isolated from the semiconductor substrate 10 by the insulating layer 12, and also that the first polysilicon layer 13-1 is completely buried in the insulating layer 12 so that the top surface of the first polysilicon layer 13-1 is covered by the insulating layer 12. The second parasitic capacitor C2 is formed between the second polysilicon layer 13-2 and the semiconductor substrate 10. A first interconnection 18-1 is selectively provided on the top surface of the insulating layer 12. The first interconnection 18-1 may be made of aluminum. The first interconnection 18-1 has a ground potential, so that the first interconnection 18-1 serves as a ground line. The first interconnection 18-1 is electrically connected through a first contact 19-1 to the second polysilicon layer 13-2. The second polysilicon layer 13-2 serves as the second voltage-dividing resistance R2. A second interconnection 18-2 is selectively provided on the top surface of the insulating layer 12. The second interconnection 18-2 may be made of aluminum. The second interconnection 18-2 has the divided voltage level Vi, so that the second interconnection 18-2 serves as a voltage dividing line connecting the output terminal of the voltage dividing circuit and the first input terminal of the comparator. The second interconnection 18-2 is electrically connected through a second contact 19-2 to the second polysilicon layer 13-2. The second interconnection 18-2 is also electrically connected through a third contact 19-3 to the first polysilicon layer 13-1. The first polysilicon layer 13-1 serves as the first voltage dividing resistance R1. A third interconnection 18-3 is selectively provided on the top surface of the insulating layer 12. The third interconnection 18-3 may be made of aluminum. The third interconnection 18-3 has the high voltage output Vo, so that the third interconnection 18-3 serves as a high voltage output line connected to the output terminal of the booster circuit 1. The third interconnection 18-3 is electrically connected through a fourth contact 19-4 to the first polysilicon layer 13-1 serving as the first voltage-dividing resistance R1. The third interconnection 18-3 serves as a high voltage output line which is further connected through a fifth contact 19-5 to the n-well region 11. The first parasitic capacitance C1 is formed between the first polysilicon layer 13-1 serving as the first voltage dividing resistance R1 and the n-well region 11 which is further connected through the first contact 19 to the third interconnection 18-3 which serves as the high voltage output line. The second parasitic capacitance C2 is formed between the second polysilicon layer 13-2 serving as the second voltage dividing resistance R2 and the p-type semiconductor substrate 10 which is grounded.

Figure 8:
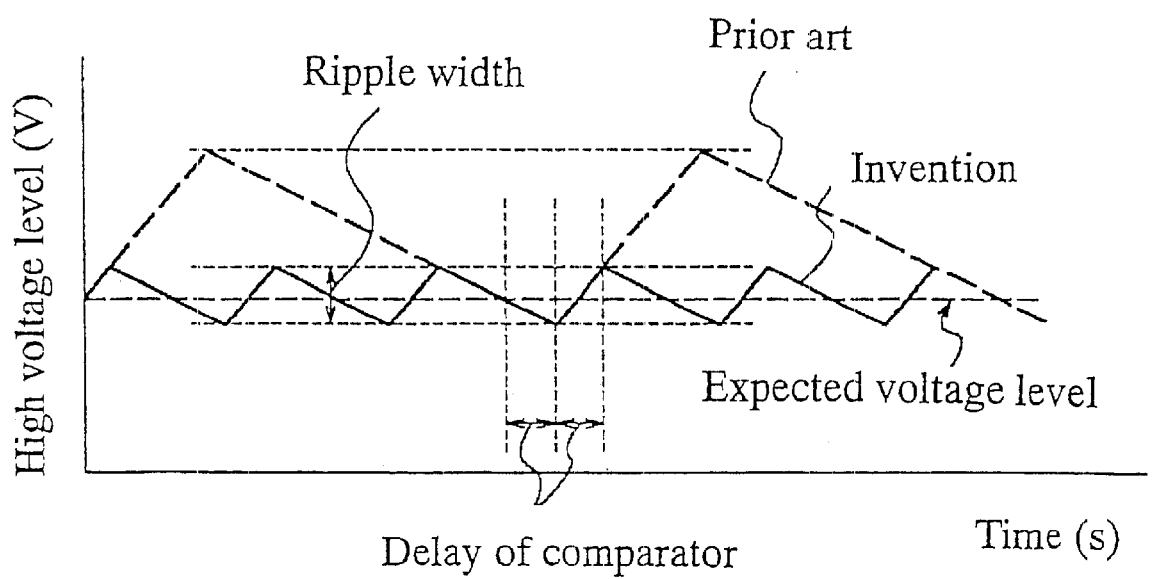
FIG. 8 is a diagram illustrative of the waveform of the high voltage output of the first novel high voltage generating circuit of FIG. 6.

FIG. 8 is a diagram illustrative of the waveform of the high voltage output of the first novel high voltage generating circuit of FIG. 6. FIG. 8 shows a ripple width "v" represented by a vertical arrow mark, an expected level represented by a horizontal broken line, and delay times of the comparator represented by two horizontal short arrow marks. The first time constant is defined by the first voltage-dividing resistance R1 and the first parasitic capacitance C1. The second time constant is defined by the second voltage-dividing resistance R2 and the second parasitic capacitance C2. The high voltage level of the high voltage output line is transmitted through the first parasitic capacitor C1 to the dividing voltage line having the divided voltage Vi appearing on the output terminal between the first and second voltage-dividing resistances R1 and R2 of the voltage-dividing circuit, thereby resulting in a remarkable reduction in a delay time of the feedback path from the output terminal of the booster circuit 1 to the output terminal of the comparator 2. During this remarkably reduced delay time period, it is difficult to control the booster circuit, whereby the high voltage output has a reduced ripple width and a non-deteriorated accuracy in its voltage level.

Figure 9:
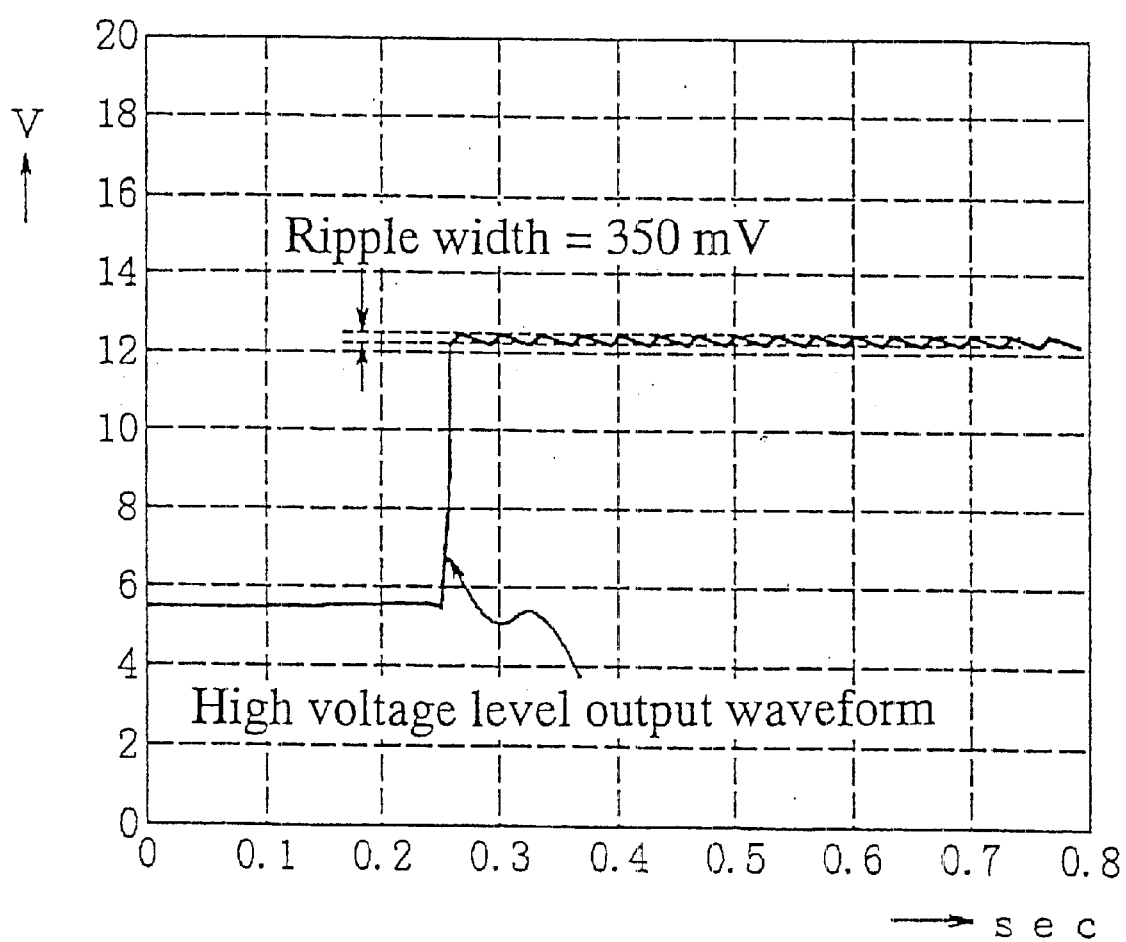
FIG. 9 is a diagram illustrative of a result of the simulation to the first novel circuit of FIG. 6.

The ripple width is given by the following equation.

$$V = Dt2 \times Vdt \tag{2}$$

where "Dt2" is the delay of the comparator, and "Vdt" is a voltage rising rate per a unit time or a boosting capability, provided the delay of the voltage-dividing resistances is approximated zero. FIG. 9 is a diagram illustrative of a result of the simulation to the first novel circuit of FIG. 6. The ripple width of the high voltage output is 350 mV provided that the first parasitic capacitance C1 of the first voltage dividing resistance is 1 pF. The reduced ripple width means the high accuracy in voltage level of the high voltage output. The first parasitic capacitance C1 of the first voltage dividing resistance R1 is connected to an output terminal of the first novel high voltage generating circuit, so that the first parasitic capacitance C1 serves as a speed up capacitor, It is unnecessary to further provide any further speed up capacitor. Accordingly, the first parasitic capacitor serving as the speed up capacitor of the first voltage dividing resistance R1 reduces the ripple width or improves the accuracy in voltage level of the high voltage output without, however, any further increase in the occupied area of the high voltage generating circuit.

SECOND EMBODIMENT

Figure 10:
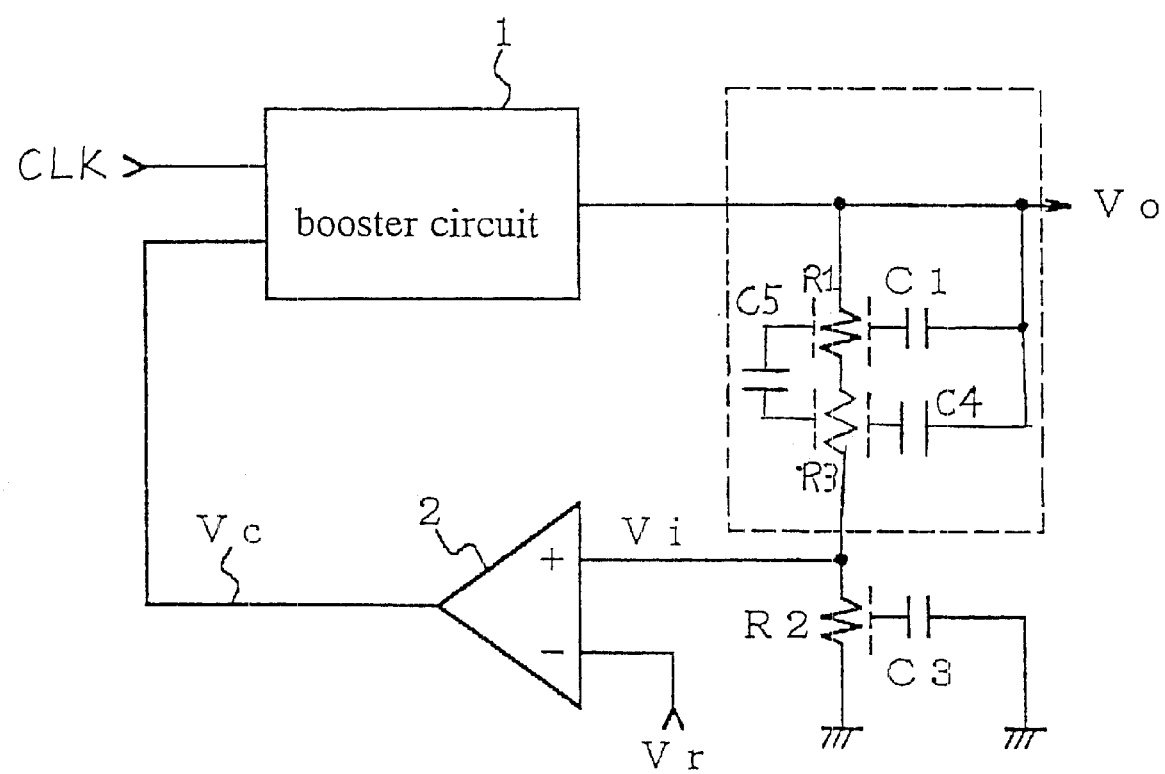
FIG. 10 is a circuit diagram illustrative of a second novel high voltage generating circuit for generating a highly accurate high voltage for writing and erasing operations of the non-volatile semiconductor memory in a second embodiment according to the present invention.

A second embodiment according to the present invention will be described in detail with reference to the drawings. FIG. 10 is a circuit diagram illustrative of a second novel high voltage generating circuit for generating a highly accurate high voltage for writing and erasing operations of the non-volatile semiconductor memory in a second embodiment according to the present invention. The second novel high voltage generating circuit comprises a booster circuit 1, a comparator 2, and a voltage dividing circuit which further comprises a series connection of first, second and third voltage dividing resistances R1, R2 and R3. The booster circuit 1 has a first input terminal for receiving a clock signal CLK and a second input terminal connected to an output terminal of the comparator 2 for receiving a control signal Vc from the comparator 2. The booster circuit 1 generates a high voltage output Vo which is outputted from its output terminal. The voltage dividing circuit, which comprises the series connection of the first, second and third voltage-dividing resistances R1, R2 and R3, is provided between the high voltage output line connected to the output terminal of the booster circuit 1 and a ground line. The first and third voltage-dividing resistances R1 and R3 are connected in series between the output terminal of the booster circuit 1 and the second voltage-dividing resistance R2. The first voltage-dividing resistance R1 is connected in series between the high voltage output line and the third voltage-dividing resistance R3. The third voltage-dividing resistance R3 is connected in series between the first voltage-dividing resistance R1 and the second voltage-dividing resistance R2. The second voltage-dividing resistance R2 is connected in series between the ground terminal and the third voltage-dividing resistance R3. An output node N1 is provided at an intermediate point between the third and second voltage-dividing resistances R3 and R2. Namely, the first and third voltage-dividing resistances R1 and R3 are connected in series between the high voltage output line and the output node N1 of the voltage dividing circuit. The first voltage-dividing resistance R1 is connected in series between the high voltage output line and the third voltage-dividing resistance R3. The third voltage-dividing R3 is connected in series between the first voltage-dividing resistance R1 and the output node N1 of the voltage dividing circuit. The second voltage-dividing resistance R2 is connected in series between the ground line and the output node N1 of the voltage dividing circuit. The comparator 2 has a first input terminal connected to the output node N1 of the voltage-dividing circuit or the intermediate point between the third and second voltage dividing resistances R3 and R2 for receiving a voltage Vi divided by the voltage-dividing circuit. The comparator 2 also has a second input terminal for receiving a reference voltage Vr for allowing the voltage Vi to be compared with the reference voltage Vr, whereby the comparator 2 generates the control signal Vc and output the same from its output terminal. The first voltage dividing resistance R1 has a first parasitic capacitance C1 which is connected to the high voltage output line. The second voltage dividing resistance R2 has a second parasitic capacitance C3 which is connected to the ground line. The third voltage dividing resistance R3 has a third parasitic capacitance C4 which is connected to the high voltage output line. Further, a fourth parasitic capacitance C5 is provided between the first and third voltage dividing resistances R1 and R3. The resistance values of the first and second voltage-dividing resistances R1 and R2 are required to be high, provided that the high relative accuracy in resistance value of each of the first and second voltage-dividing resistances R1 and R2 is also necessary. For those purposes, the first, second and third voltage-dividing resistances R1, R2 and R3 may further comprise polysilicon resistances which are low in bias-dependency and are suitable to be higher resistances than the diffusion resistances.

The first, second and third voltage-dividing resistances R1, R2 and R3 need larger occupying areas than other resistances, whereby the larger occupying areas of the first, second and third voltage-dividing resistances R1, R2 and R3 result in the increases in first, second, third and fourth parasitic capacitances C1, C3, C4 and C5. The first voltage-dividing resistance R1 has a first time constant which is defined by the resistance value and the parasitic capacitance value thereof The second voltage-dividing resistance R2 has a second time constant which is defined by the resistance value and the parasitic capacitance value thereof. The accuracy in the voltage level of the high voltage output depends on the time constant. The first parasitic capacitance C1 is connected to the high voltage output line connected to the output terminal of the booster circuit 1, so that the first parasitic capacitance C1 serves as a speed up capacitor. The second parasitic capacitance C3 is connected to the ground line. The third parasitic capacitance C4 is also connected to the high voltage output line connected to the output terminal of the booster circuit 1, so that the third parasitic capacitance C4 serves as a speed up capacitor.

It is important for the present invention that the first parasitic capacitance C1 of the first voltage dividing resistance R1 is connected to the high voltage output line, so that the first parasitic capacitance C1 serves as a speed up capacitor, and further the third parasitic capacitance C4 of the third voltage dividing resistance R3 is also connected to the high voltage output line, so that the first and third parasitic capacitances C1 and C4 serve as a speed up capacitor. It is unnecessary to further provide any further speed up capacitor. Accordingly, the first parasitic capacitor C1 and the third parasitic capacitor C4 serving as the speed up capacitor reduces the ripple width or improves the accuracy in voltage level of the high voltage output without, however, any further increase in the occupied area of the high voltage generating circuit.

Figure 11:
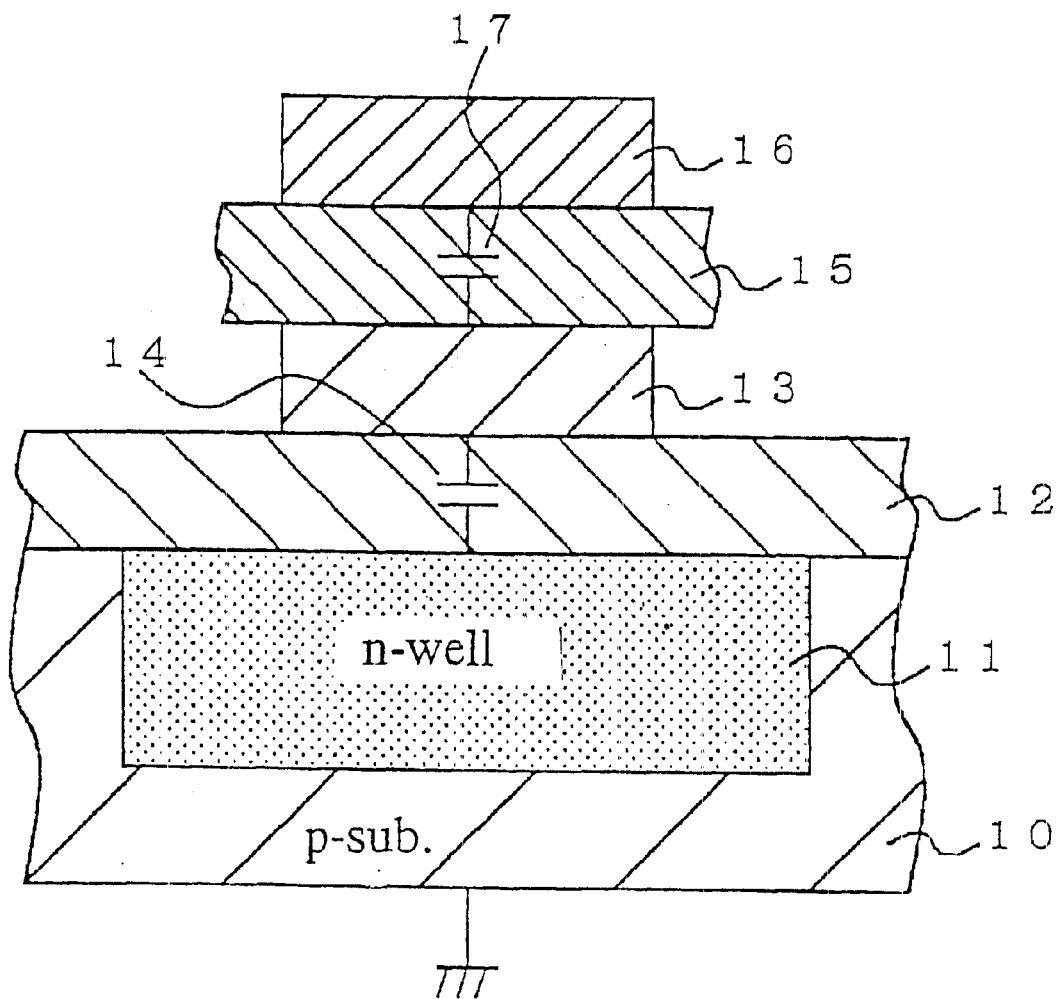
FIG. 11 is a fragmentary cross sectional elevation view illustrative of the voltage-dividing circuit of the second novel high voltage generating circuit in FIG. 10 realized in the semiconductor integrated circuit in the second embodiment in accordance with the present invention.

The above second novel high voltage generating circuit is incorporated in the semiconductor integrated circuit. FIG. 11 is a fragmentary cross sectional elevation view illustrative of the voltage-dividing circuit of the second novel high voltage generating circuit in FIG. 10 realized in the semiconductor integrated circuit in the second embodiment in accordance with the present invention.

An n-well region 11 is selectively provided in a p-type semiconductor substrate 10. The n-well region 11 is connected through a non-illustrated contact to the high voltage output line not illustrated. A first insulating layer 12 is provided which extends over a top surface of the n-well region 11 and the top surface of the p-type semiconductor substrate 10. A first polysilicon layer 13 serving as the first voltage-dividing resistance R1 is selectively provided which extends over the top surface of the first insulating layer 12. The first polysilicon layer 13 is positioned indirectly over the n-well region 11, which is connected to the high voltage output line, whereby the first parasitic capacitance 14 as the capacitance C1 is formed across the first insulating layer 12 between the well region 11 and the first polysilicon layer 13 serving as the first voltage-dividing resistance R1. A second insulating layer 15 is provided which extends over the top surface of the first polysilicon layer 13. A second polysilicon layer 16 serving as the third voltage-dividing resistance R3 is selectively provided which extends over the top surface of the second insulating layer 15. A fifth parasitic capacitance 17 of the capacitance value C5 is formed across the second insulating layer 15 between the first polysilicon layer 13 and the second polysilicon layer 16. The second polysilicon layer 16 is connected to the output node N1 of the voltage dividing circuit. The second polysilicon layer 16 is further isolated by an insulation layer not illustrated from the high voltage output line, so that the third parasitic capacitance C4 is formed across the insulation layer not illustrated. The first and second polysilicon layers 13 and 16 are included in the lamination structure, so that no increase in occupied area of the circuit is caused even though the two speed up capacitors are provided to further reduce the ripple width. It is preferable that the high voltage output line is connected to all of the parasitic capacitances processed by all of the voltage dividing resistances connected in series between the high voltage output line and the output node N1 of the voltage dividing circuit. Accordingly, the first parasitic capacitor C1 and the third parasitic capacitor C4 serving as the speed up capacitor further reduces the ripple width or improves the accuracy in voltage level of the high voltage output without, however, any further increase in the occupied area of the high voltage generating circuit.

THIRD EMBODIMENT

Figure 12:
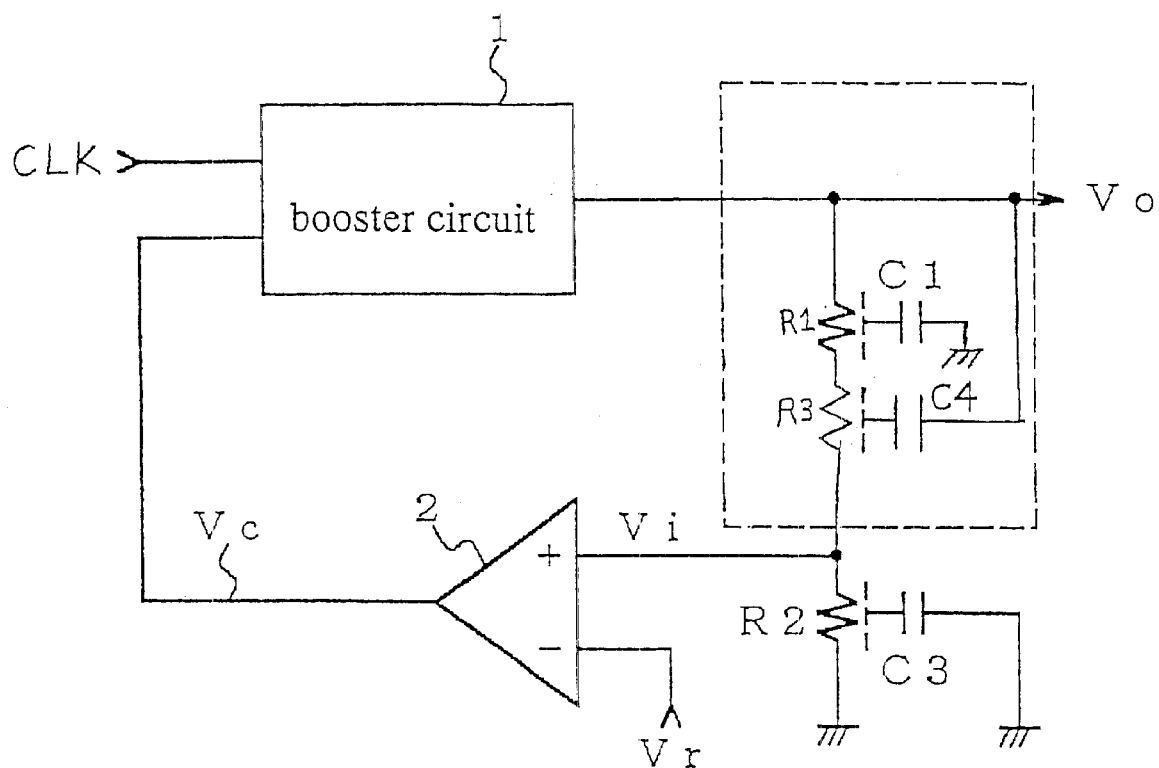
FIG. 12 is a circuit diagram illustrative of a third novel high voltage generating circuit for generating a highly accurate high voltage for writing and erasing operations of the non-volatile semiconductor memory in a third embodiment according to the present invention.

A third embodiment according to the present invention will be described in detail with reference to the drawings. FIG. 12 is a circuit diagram illustrative of a third novel high voltage generating circuit for generating a highly accurate high voltage for writing and erasing operations of the non-volatile semiconductor memory in a third embodiment according to the present invention. The third novel high voltage generating circuit comprises a booster circuit 1, a comparator 2, and a voltage dividing circuit which further comprises a series connection of first, second and third voltage dividing resistances R1, R2 and R3. The booster circuit 1 has a first input terminal for receiving a clock signal CLK and a second input terminal connected to an output terminal of the comparator 2 for receiving a control signal Vc from the comparator 2. The booster circuit 1 generates a high voltage output Vo which is outputted from its output terminal. The voltage dividing circuit, which comprises the series connection of the first, second and third voltage-dividing resistances R1, R2 and R3, is provided between the high voltage output line connected to the output terminal of the booster circuit 1 and a ground line. The first and third voltage-dividing resistances R1 and R3 are connected in series between the output terminal of the booster circuit 1 and the second voltage-dividing resistance R2. The first voltage-dividing resistance R1 is connected in series between the high voltage output line and the third voltage-dividing resistance R3. The third voltage-dividing resistance R3 is connected in series between the first voltage-dividing resistance R1 and the second voltage-dividing resistance R2. The second voltage-dividing resistance R2 is connected in series between the ground terminal and the third voltage-dividing resistance R3. An output node N1 is provided at an intermediate point between the third and second voltage-dividing resistances R3 and R2. Namely, the first and third voltage-dividing resistances R1 and R3 are connected in series between the high voltage output line and the output node N1 of the voltage dividing circuit. The first voltage-dividing resistance R1 is connected in series between the high voltage output line and the third voltage-dividing resistance R3. The third voltage-dividing resistance R3 is connected in series between the first voltage-dividing resistance R1 and the output node N1 of the voltage dividing circuit. The second voltage-dividing resistance R2 is connected in series between the ground line and the output node N1 of the voltage dividing circuit. The comparator 2 has a first input terminal connected to the output node N1 of the voltage-dividing circuit or the intermediate point between the third and second voltage dividing resistances R3 and R2 for receiving a voltage Vi divided by the voltage-dividing circuit. The comparator 2 also has a second input terminal for receiving a reference voltage Vr for allowing the voltage Vi to be compared with the reference voltage Vr, whereby the comparator 2 generates the control signal Vc and output the same from its output terminal. The first voltage dividing resistance R1 has a first parasitic capacitance C1 which is connected to the ground line. The second voltage dividing resistance R2 has a second parasitic capacitance C3 which is also connected to the ground line. The third voltage dividing resistance R3 has a third parasitic capacitance C4 which is connected to the high voltage output line. The resistance values of the first and second voltage-dividing resistances R1 and R2 are required to be high, provided that the high relative accuracy in resistance value of each of the first and second voltage-dividing resistances R1 and R2 is also necessary. For those purposes, the first, second and third voltage-dividing resistances R1, R2 and R3 may further comprise polysilicon resistances which are low in bias-dependency and are suitable to be higher resistances than the diffusion resistances.

The first, second and third voltage-dividing resistances R1, R2 and R3 need larger occupying areas than other resistances, whereby the larger occupying areas of the first, second and third voltage-dividing resistances R1, R2 and R3 result in the increases in first, second and third parasitic capacitances C1, C3 and C4. The first voltage-dividing resistance R1 has a first time constant which is defined by the resistance value and the parasitic capacitance value thereof. The second voltage-dividing resistance R2 has a second time constant which is defined by the resistance value and the parasitic capacitance value thereof. The accuracy in the voltage level of the high voltage output depends on the time constant. The first parasitic capacitance C1 is connected to the ground line. The second parasitic capacitance C3 is also connected to the ground line. The third parasitic capacitance C4 is connected to the high voltage output line connected to the output terminal of the booster circuit 1, so that the third parasitic capacitance C4 serves as a speed up capacitor.

It is important for the present invention that the third parasitic capacitance C4 of the third voltage dividing resistance R3, which is closer to the output node N1 of the voltage dividing circuit, is connected to the high voltage output line, so that the third parasitic capacitance C4 serves as a speed up capacitor. It is unnecessary to further provide any further speed up capacitor. Accordingly, the third parasitic capacitor C4 serving as the speed up capacitor reduces the ripple width or improves the accuracy in voltage level of the high voltage output without, however, any further increase in the occupied area of the high voltage generating circuit. As described above, if the high voltage output line is connected to the parasitic capacitance C4 of the voltage dividing resistance R3 which is closer to the output node N1 of the voltage dividing circuit and which is positioned in the higher voltage side than the output node N1, then the effect of reducing the ripple width is greater as compared to the other case wherein the high voltage output line is connected to the parasitic capacitance C1 of the voltage dividing resistance R1 which is closer to the high voltage output line. Nothwithstanding, it is most preferable that the high voltage output line is connected to both the parasitic capacitances C1 and C4 of the voltage dividing resistances R1 and R3 as in the second embodiment.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A circuitry comprising:
    a first circuit for raising a voltage level, said first circuit having an output terminal connected to a high voltage output line for outputting a high voltage output;
    a comparator having an output terminal connected to an input side of said first circuit, said comparator further having a first input terminal and a second input terminal for receiving a reference voltage; and
    a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line,
    wherein a parasitic capacitance of said at least one resistance between said output node and said high voltage output line is connected to said high voltage output line,
    wherein said at least one resistance between said output node and said high voltage output line comprises a plurality of resistances connected in series, and
    wherein parasitic capacitances of all of said resistances are connected to said high voltage output line.

2. The circuitry as claimed in claim 1, wherein said resistances have further parasitic capacitances connected to each other.

3. The circuitry as claimed in claim 1, wherein said plurality of resistances between said output node and said high voltage output line comprises two resistances connected in series, and parasitic capacitances of said two resistances are connected to said high voltage output line.

4. The circuitry as claimed in claim 1, wherein said first circuit comprises a booster circuit.

5. The circuitry as claimed in claim 1, wherein said low voltage line comprises a ground line.

6. The circuitry as claimed in claim 1, wherein resistances of said voltage dividing circuit comprises electrically conductive layers provided in an insulating layer extending over a semiconductor substrate, and said electrically conductive layer of said plural resistances between said output node and said high voltage output line is positioned over a well region in said semiconductor substrate and is isolated by said insulating layer, so that a parasitic capacitance of said plural resistances is formed between said well region and said electrically conductive layer, and said well region is electrically connected to said high voltage output line.

7. The circuitry as claimed in claim 6, wherein said well region has a first conductivity type and said semiconductor substrate has a second conductivity type and said semiconductor substrate is electrically connected to said low voltage line.

8. The circuitry as claimed in claim 7, wherein said low voltage line comprises a ground line.

9. The circuitry as claimed in claim 7, wherein said high voltage output line, said output node and said low voltage are provided over a top surface of said insulating layer.

10. The circuitry as claimed in claim 6, wherein said electrically conductive layers comprise polysilicon layers.

11. A circuitry comprising:
    a first circuit for raising a voltage level, said first circuit having an output terminal connected to a high voltage output line for outputting a high voltage output;
    a comparator having an output terminal connected to an input side of said first circuit, said comparator further having a first input terminal and a second input terminal for receiving a reference voltage; and
    a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line,
    wherein a parasitic capacitance of said at least one resistance between said output node and said high voltage output line is connected to said high voltage output line,
    wherein said at least one resistance between said output node and said high voltage output line comprises a plurality of resistances connected in series, and a parasitic capacitance of at least a closest one of said resistances to said output node is connected to said high output voltage line, and wherein said plural resistances between said output node and said high voltage output line comprises two resistances connected in series, and a parasitic capacitance of a first one of said two resistances closer to said output node is connected to said high voltage output line and a parasitic capacitance of a second one of said two resistances closer to said high voltage line is connected to said low voltage line.

12. A circuitry comprising:
    a first circuit for raising a voltage level, said first circuit having an output terminal connected to a high voltage output line for outputting a high voltage output;
    a comparator having an output terminal connected to an input side of said first circuit, said comparator further having a first input terminal and a second input terminal for receiving a reference voltage; and
    a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line,
    wherein a parasitic capacitance of said at least one resistance between said output node and said high voltage output line is connected to said high voltage output line,
    wherein said at least one resistance between said output node and said high voltage output line comprises first and second resistances, and
    said first resistance comprises a first electrically conductive layer extending over a first insulating layer which extends over a well region in a semiconductor substrate, and said well region is electrically connected to said high voltage output line, and a parasitic capacitance of said first resistance is provided across said first insulating layer between said well region and said first electrically conductive layer; and said second resistance comprises a second electrically conductive layer extending over a second insulating layer which extends over said first electrically conductive layer, and said second electrically conductive layer is electrically connected to said high voltage output line.

13. The circuitry as claimed in claim 12, wherein said well region has a first conductivity type and said semiconductor substrate has a second conductivity type and said semiconductor substrate is electrically connected to said low voltage line.

14. The circuitry as claimed in claim 13, wherein said low voltage line comprises a ground line.

15. The circuitry as claimed in claim 12, wherein said first and second electrically conductive layers comprise polysilicon layers.

16. A circuitry comprising:

a first circuit for raising a voltage level, said first circuit having an output terminal connected to a high voltage output line for outputting a high voltage output;

a comparator having an output terminal connected to an input side of said first circuit, said comparator further having a first input terminal and a second input terminal for receiving a reference voltage; and a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line, wherein a parasitic capacitance of said at least one resistance between said output node and said high voltage output line is connected to said high voltage output line, wherein said voltage dividing circuit has at least a low voltage side resistance between said output node and said low voltage line, and a parasitic capacitance of said at least low voltage side resistance is connected to said low voltage line.

17. A high voltage generating circuit in a semiconductor device comprising:

a booster circuit having a first input terminal for receiving a clock signal and a second input terminal, and also said booster circuit having an output terminal connected to a high voltage output line for outputting a high voltage output;

a comparator having an output terminal connected to said second input terminal of said booster circuit, said comparator further having a first input terminal and a second input terminal for receiving a reference voltage; and a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line, and said voltage dividing circuit having at least one low voltage side resistance between said output node and said low voltage line, wherein a parasitic capacitance of said at least one resistance between said output node and said high voltage output line is connected to said high voltage output line, and a parasitic capacitance of said at least one low voltage side resistance is connected to said low voltage line, wherein said at least one resistance between said output node and said high voltage output line comprises a plurality of resistances connected in series, and wherein said parasitic capacitances of all of said resistances are connected to said high voltage output line.

18. The high voltage generating circuit in a semiconductor device as claimed in claim 17, wherein said resistances have further parasitic capacitances connected to each other.

19. The high voltage generating circuit in a semiconductor device as claimed in claim 17, wherein said plural resistances between said output node and said high voltage output line comprises two resistances connected in series, and parasitic capacitances of said two resistances are connected to said high voltage output line.

20. The high voltage generating circuit in a semiconductor device as claimed in claim 17, wherein said plural resistances between said output node and said high voltage output line comprises two resistances connected in series, and a parasitic capacitance of a first one of said two resistances closer to said output node is connected to said high voltage output line and a parasitic capacitance of a second one of said two resistances closer to said high voltage line is connected to said low voltage line.

21. The high voltage generating circuit in a semiconductor device as claimed in claim 17, wherein said low voltage line comprises a ground line.

22. The high voltage generating circuit in a semiconductor device as claimed in claim 17, wherein resistances of said voltage dividing circuit comprises electrically conductive layers provided in an insulating layer extending over a semiconductor substrate, and said electrically conductive layer of said at least one resistance between said output node and said high voltage output line is positioned over a well region in said semiconductor substrate and is isolated by said insulating layer, so that a parasitic capacitance of said at least one resistance is formed between said well region and said electrically conductive layer, and said well region is electrically connected to said high voltage output line.

23. The high voltage generating circuit in a semiconductor device as claimed in claim 22, wherein said well region has a first conductivity type and said semiconductor substrate has a second conductivity type and said semiconductor substrate is electrically connected to said low voltage line.

24. The high voltage generating circuit in a semiconductor device as claimed in claim 23, wherein said low voltage line comprises a ground line.

25. The high voltage generating circuit in a semiconductor device as claimed in claim 23, wherein said high voltage output line, said output node and said low voltage are provided over a top surface of said insulating layer.

26. The high voltage generating circuit in a semiconductor device as claimed in claim 22, wherein said electrically conductive layer comprises polysilicon layers.

27. A high voltage generating circuit in a semiconductor device comprising:

a booster circuit having a first input terminal for receiving a clock signal and a second input terminal, and also said booster circuit having an output terminal connected to a high voltage output line for outputting a high voltage output;

a comparator having an output terminal connected to said second input terminal of said booster circuit, said comparator further having a first input terminal and a second input terminal for receiving a reference voltage; and a voltage dividing circuit connected between said high voltage output line and a low voltage line having a substantially fixed lower potential than said high voltage output line, said voltage dividing circuit having an output node which is connected to said first input terminal of said comparator for outputting a divided voltage output; and said voltage dividing circuit having at least one resistance between said output node and said high voltage output line, and said voltage dividing circuit having at least one low voltage side resistance between said output node and said low voltage line, wherein a parasitic capacitance of said at least one resistance between said output node and said high voltage output line is connected to said high voltage output line, and a parasitic capacitance of said at least one low voltage side resistance is connected to said low voltage line, wherein said at least one resistance between said output node and said high voltage output line comprises first and second resistances, and said first resistance comprises a first electrically conductive layer extending over a first insulating layer which extends over a well region in a semiconductor substrate, and said well region is electrically connected to said high voltage output line, and a parasitic capacitance of said first resistance is provided across said first insulating layer between said well region and said first electrically conductive layer; and said second resistance comprises a second electrically conductive layer extending over a second insulating layer which extends over said first electrically conductive layer, and said second electrically conductive layer is electrically connected to said high voltage output line.

28. The high voltage generating circuit in a semiconductor device as claimed in claim 27, wherein said well region has a first conductivity type and said semiconductor substrate has a second conductivity type and said semiconductor substrate is electrically connected to said low voltage line.

29. The high voltage generating circuit in a semiconductor device as claimed in claim 28, wherein said low voltage line comprises a ground line.

30. The high voltage generating circuit in a semiconductor device as claimed in claim 27, wherein said first and second electrically conductive layers comprise polysilicon layers.

* * * * *